(12) United States Patent
Sugishima et al.

(10) Patent No.: US 7,221,067 B2
(45) Date of Patent: May 22, 2007

(54) ARMATURE AND METHOD FOR MANUFACTURING ARMATURE

(75) Inventors: Kazushi Sugishima, Hamamatsu (JP); Akihiro Suzuki, Kosai (JP); Souhei Yamada, Shizuoka-ken (JP)

(73) Assignee: ASMO, Co. Ltd. (JP)

( * ) Notice: Subject to any disclaimer, the term of this patent is extended or adjusted under 35 U.S.C. 154(b) by 0 days.

(21) Appl. No.: 10/830,625

(22) Filed: Apr. 23, 2004

(65) Prior Publication Data

US 2004/0212256 A1  Oct. 28, 2004

(30) Foreign Application Priority Data

Apr. 25, 2003  (JP)  ............... 2003-121860

(51) Int. Cl.
*H02K 15/12* (2006.01)
(52) U.S. Cl. ......................... 310/44; 310/216
(58) Field of Classification Search ............ 310/42–44, 310/216–218, 259
See application file for complete search history.

(56) References Cited

U.S. PATENT DOCUMENTS 6,369,483 B1 * 4/2002 Hill ........................ 310/216

2002/0117907 A1 * 8/2002 Gay et al. ...................... 310/44
2003/0062786 A1 * 4/2003 Reiter et al. ........... 310/156.08
2003/0193258 A1 * 10/2003 Reiter et al. ................. 310/216
2003/0193260 A1 * 10/2003 Reiter et al. ................. 310/217

FOREIGN PATENT DOCUMENTS

| JP | 49-56107 | 5/1974 |
|----|----------|--------|
| JP | 63-028241 | 2/1988 |
| JP | 05-022885 | 1/1993 |
| JP | 06-113493 | 4/1994 |
| JP | 2001-298918 | 10/2001 |
| JP | 2003-009480 | 1/2003 |

* cited by examiner

*Primary Examiner*—Thanh Lam
(74) *Attorney, Agent, or Firm*—Marsh Fischmann & Breyfogle LLP

(57) ABSTRACT

An armature for a motor. The armature includes a core formed of compression-molded metal powder. The core has a continuous outer wall, an inner wall defining a slot, and a nonmagnetic section arranged on the outer wall. A coil is arranged in the slot. The coil and the slot have the same hexagonal shape to minimize gaps when the coil is fitted in the slot.

18 Claims, 7 Drawing Sheets

US 7,221,067 B2

ARMATURE AND METHOD FOR MANUFACTURING ARMATURE

BACKGROUND OF THE INVENTION

The present invention relates to an armature for use in a rotary electric machine and a method for manufacturing such an armature.

A large number of motors are used in various types of mechatronic products. This has resulted in a demand for motors that are more compact and inexpensive. Japanese Laid-Open Patent Publication No. 2001-298918 describes a typical armature of a motor. As shown in FIG. 12, the armature includes a core 81, which is attached to a rotary shaft 80, and a coil 82, which is wound in the core 81. The core 81 includes a base 81a and teeth 81b, which extend radially from the base 81a. Coil slots 86 are defined between adjacent teeth 81b to receive the coil 82. The coil 82 includes a plurality of bundled wires 83, which are coated with an insulative material such as enamel. The wires 83 are wound about the teeth 81b, as shown in FIG. 13. Each wire 83 is fed from a wire feeder to the core 81 via a flyer 84. The flyer 84 is then rotated to wind the wire 83 to the core 81.

However, the wire 83 has a round cross-section. This forms gaps 85, or dead space, between adjacent wires 83. It is thus difficult to increase the space factor of the coil 82. Consequently, the number of windings of each wire 83 must be increased. This requires the coil slots 86 to be enlarged, which in turn, would enlarge the core 81 and increase the size of the motor. In addition, an increase in the windings of the wires 83 on the core 81 increases manufacturing costs.

SUMMARY OF THE INVENTION

One aspect of the present invention is an armature for a rotary electric machine. The armature includes a core formed of compression-molded metal powder and has a continuous outer wall, an inner wall defining a slot, and a nonmagnetic section arranged on the outer wall. A coil is arranged in the slot.

Another aspect of the present invention is a method for manufacturing an armature for a rotary electric machine. The method includes forming a core having a continuous outer wall and an inner wall defining a slot by compression-molding nonmagnetic powder, magnetizing the core, forming a nonmagnetic section in the magnetized core, and arranging a coil in the slot of the core.

A further aspect of the present invention is a method for manufacturing an armature for a rotary electric machine. The method includes forming a core having a continuous outer wall and an inner wall defining a slot by compression-molding magnetic powder, forming a nonmagnetic section in the magnetized core, and arranging a coil in the slot of the core.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A preferred embodiment of the present invention will now be discussed with reference to FIGS. 1 to 5

Figure 1:
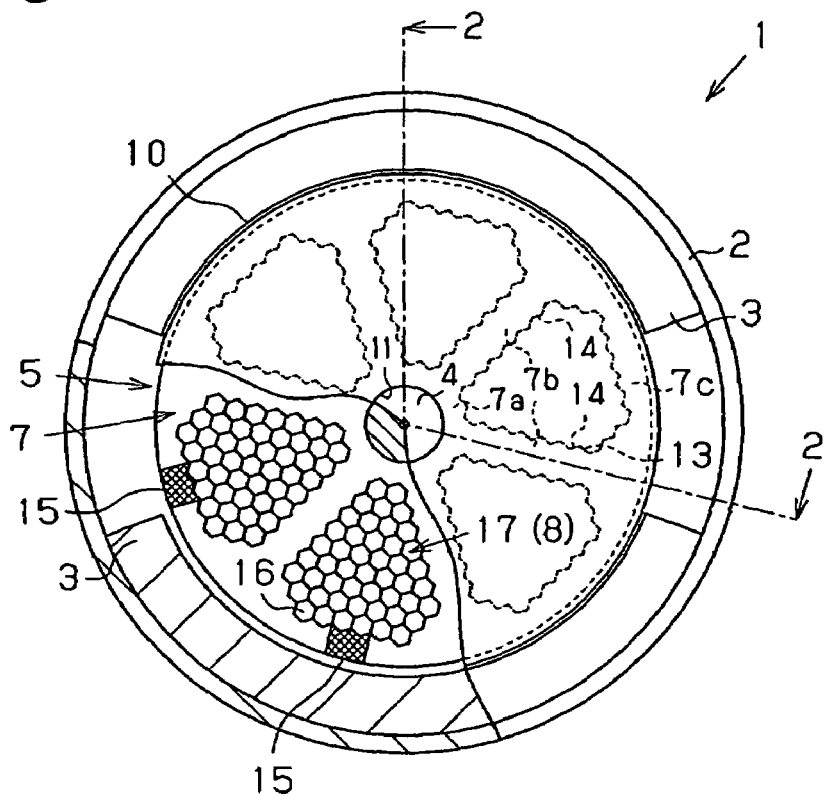
FIG. 1 is a cross-sectional view showing a motor according to a preferred embodiment of the present invention.
Figure 2:
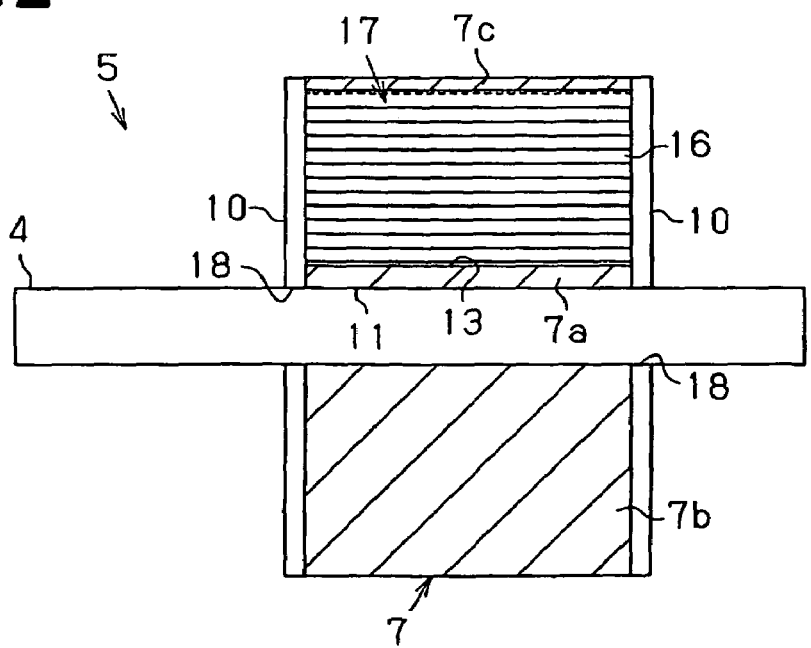
FIG. 2 is a cross-sectional view taken along line 2—2 in FIG. 1.
Figure 3:
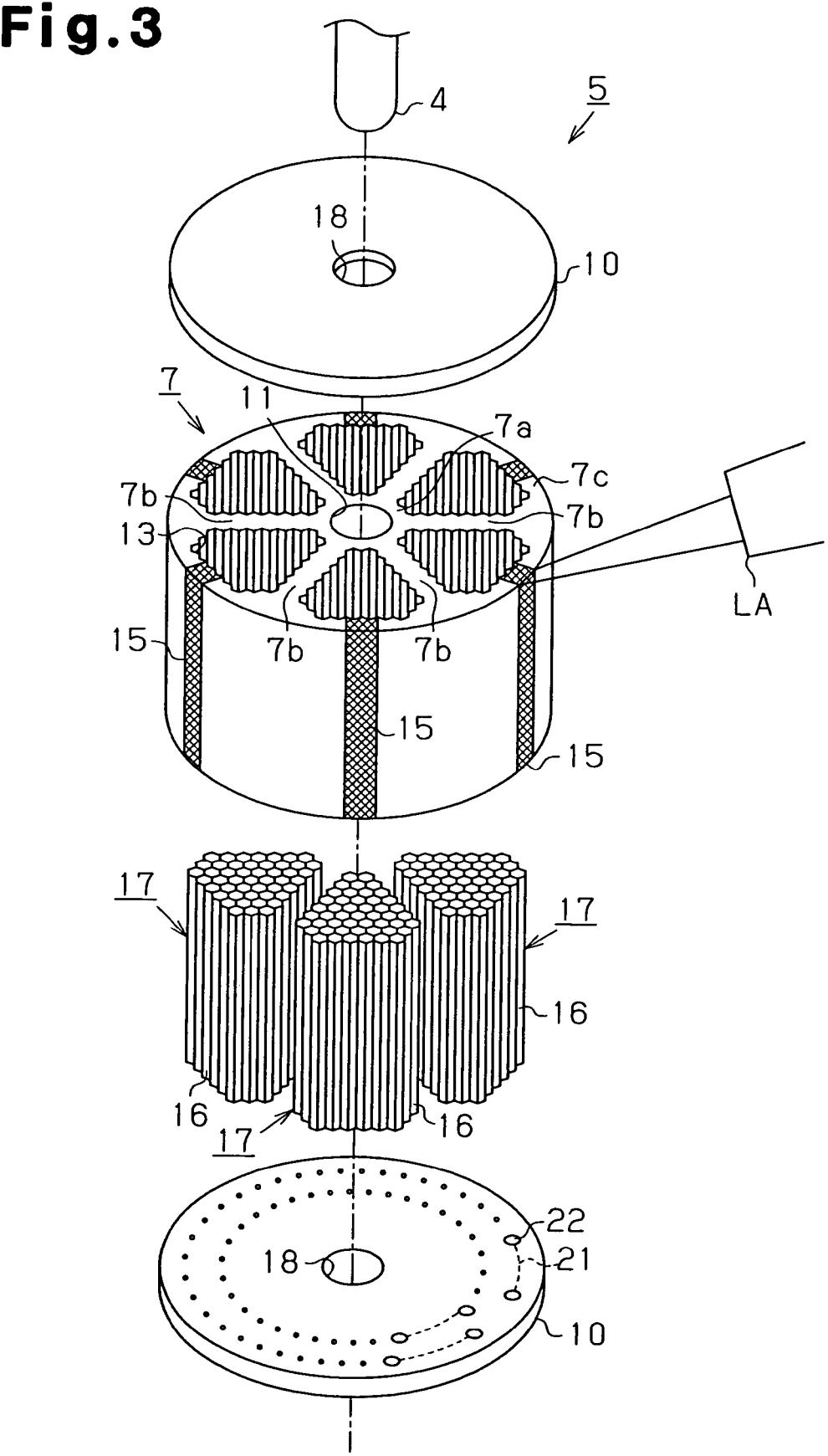
FIG. 3 is an exploded perspective view showing an armature of the motor of FIG. 1.

Referring to FIGS. 1 to 3, a motor 1, which serves as a rotary electric machine, includes a cylindrical yoke housing 2. The yoke housing 2 has an inner surface to which two magnets 3 are fixed. An armature 5 is rotatably accommodated between the two magnets 3.

The armature 5 includes a rotary shaft 4, a core 7, a coil 8, and pattern boards 10, which serve as conductive members. The core 7, which is generally cylindrical, is fitted on the rotary shaft 4. The core 7 is formed by sintering soft magnetic metal powder, or a soft magnetic composite (SMC), and coating the entire surface of the sintered product with an insulative oxide film. In this case, nonmagnetic metal powder, which includes austenitic material, is pressurized or heat-treated to undergo martensitic transformation. This transforms the nonmagnetic metal powder to the soft magnetic metal powder that is used to form the core 7.

The core 7 includes a base 7a, teeth 7b extending radially from the base 7a, and an outer wall 7c connecting the distal portions of the teeth 7b. A bore 11 extends axially through the center of the base 7a in the core 7. A rotary shaft 4 is inserted through the bore 11. A coil slot 13 is defined between each pair of adjacent teeth 7b to receive the coil 8. In other words, the space between the base 7a and the outer wall 7c is partitioned by the teeth 7b to define the coil slots 13.

The outer wall 7c of the core 7 extends continuously in the circumferential direction. Belt-shaped nonmagnetic sections 15 extend axially along the outer wall 7c. The nonmagnetic sections 15 are formed by, for example, locally heating the outer wall 7c of the core 7 with a laser beam. The nonmagnetic sections 15, which minimize magnetic loss, are arranged at equal angular intervals about the axis of the core 7. A nonmagnetic section 15 is formed between each pair of adjacent teeth 7b. Thus, the quantity of nonmagnetic sections 15 is the same as that of the coil slots 13 (six in the preferred embodiment).

Each coil slot 13 receives a bundle 17 of wires 16, which form the coil 8. An inner wall 14 that defines each coil slot 13 and extends along the base 7a, the teeth 7b, and the inner side of the outer wall 7c is shaped to match the cross-sectional shape of the bundle 17 of the wires 16. Accordingly, the inner wall 14 defining each coil slot 13 is shaped to enable the bundle 17 of wires 16 to be fitted therein.

Each wire 16 has a cross-section that is a regular hexagon. The wires 16 are arranged in each coil slot 13 in a regular manner and honeycombed. The outer surface of each wire 16 is coated by an insulative material such as enamel. Further, the gap between the outer surface of each wire 16 and the outer surfaces of the adjacent wires 16 is subtle. The gap between the periphery of the bundle 17 of the wires 16 and the inner wall 14 of the associated coil slot 13 is also subtle.

The length of the wires 16 is substantially the same as the axial length of the core 7. Each pattern board 10 is attached to one of the end faces of the core 7 to connect the ends of two wires 16 on the same side of the core 7. The pattern boards 10 are disk-shaped and have substantially the same diameter as the core 7. A hole 18 for insertion of the rotary shaft 4 extends through the center of each pattern board 10.

Figure 4:
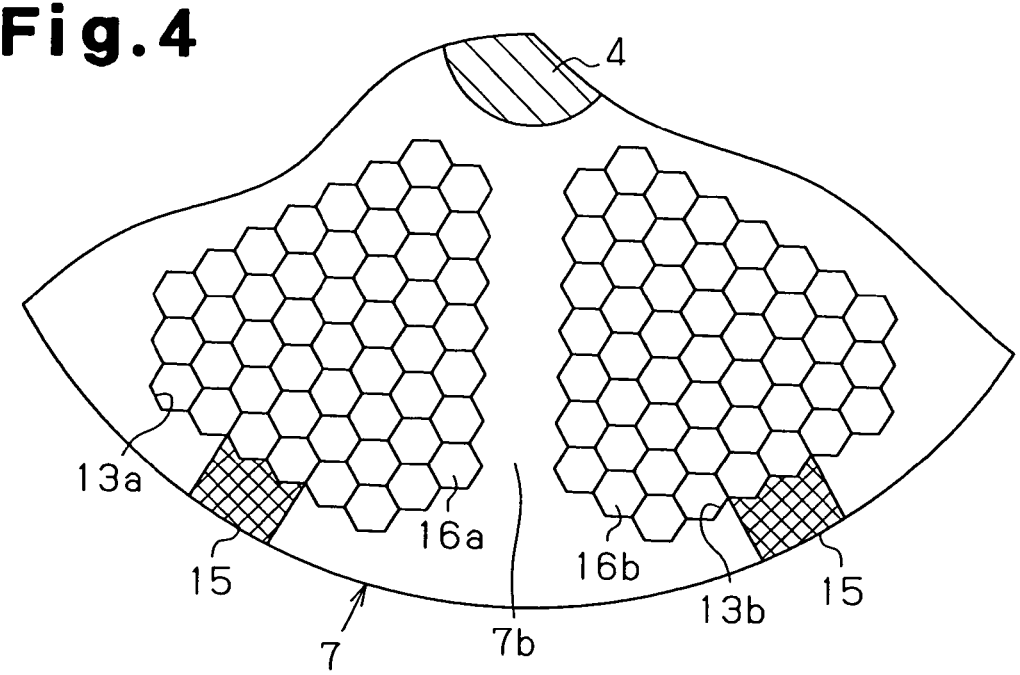
FIG. 4 is a partial cross-sectional view showing a core in the armature of FIG. 3.
Figure 5:
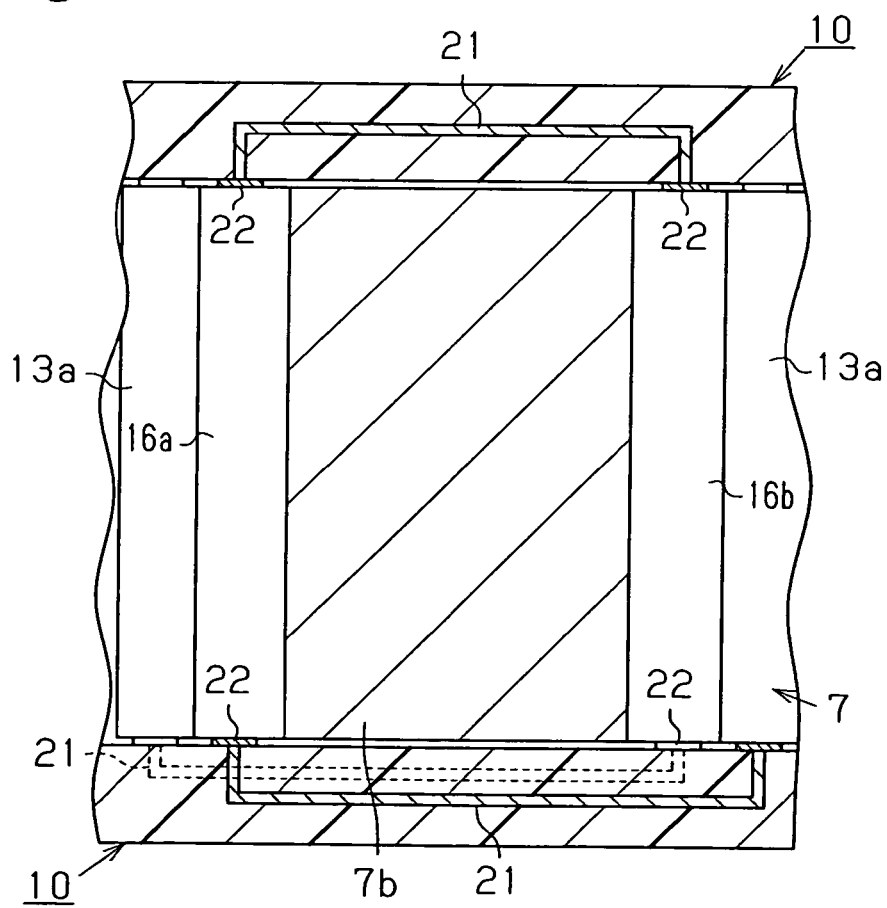
FIG. 5 is a schematic diagram showing the structure of a coil in the core of FIG. 4.

The structure of the coil 8 will now be discussed. With reference to FIGS. 4 and 5, in the preferred embodiment, the coil 8 is formed by connecting wires 16a, serving as a coil portion in one coil slot 13a, to wires 16b, serving as another coil portion in another coil slot 13b. In other words, the coil 8 refers to a coiled conductor extending about one of the teeth 7b of the core 7.

Conductive lines 21 are patterned in each pattern board 10. Contacts 22 extending from the conductive lines 21 are formed on each pattern board 10 on the surface facing towards the core 7. The pattern boards 10 are attached to the end faces of the core 7 so that the contacts 22 are pressed against the ends of the wires 16a and the ends of the wires 16b. Accordingly, the contacts 22 electrically connect the wires 16a and 16b to the conductive lines 21 to form a coiled conductor around one of the teeth 7b of the core 7. In this manner, each coil slot 13 of the core 7 receives the coil 8, which is formed by the bundle 17 of the wires 16 and the pattern board 10.

A method for manufacturing the armature 5 will now be discussed with reference to FIG. 3

First, nonmagnetic metal powder, which includes austenitic material, is heat-treated to produce soft magnetic metal powder. Then, the soft magnetic power undergoes compression molding to produce a molded product. Afterwards, the molded product is sintered to form the core 7. The sintered product, or the core 7, is then locally heated from the outer side by a laser beam or the like to form the nonmagnetic sections 15 in the outer wall 7c of the core 7.

Then, the wires 16 are cut into a predetermined length and bundled so that the cross-sectional shape of a bundle 17 matches the shape of the coil slots 13. Each bundle 17 of the wires 16 obtained in this manner is then fitted into one of the coil slots 13 from one of the end faces of the core 7.

Subsequently, the pattern boards 10 are attached to the end faces of the core 7 to connect the ends of the wires 16 which are located at predetermined positions. In this state, the contacts 22 are pressed against the ends of the wires 16. Each conductive line 21 of the pattern boards 10 connects one wire 16 with another wire 16. This forms the coil 8 in the coil slots 13 of the core 7.

The preferred embodiment has the advantages described below.

(1) Each wire 16 has a cross-section that is a regular hexagon. This enables wires 16 to be arranged next to each other with their surfaces being close to each other, reduces the gaps between the wires 16 that form the coil 8, and increases the space factor of the coil 8 in each coil slot 13. Further, the inner wall 14 defining each coil slot 13 is formed to enable the bundle 17 of the wires 16 to be fitted into the coil slot 13. Accordingly, the wires 16 are arranged closely to the inner wall 14 in each coil slot 13. This reduces the gaps between the wires 16, which form the coil 8, and the inner wall 14 of each coil slot 13. As a result, the space factor of the coil 8 in each coil slot 13 is further increased. This decreases the area of each coil slot 13 and enables the dimensions of the coil slot 13 to be reduced in comparison to the prior art when the number of windings of the coil 8 is the same. If the area of each coil slot 13 is the same as in the prior art, the number of windings of the coil 8 may be increased to increase the magnetic flux density. Accordingly, the preferred embodiment enables the size of the motor 1 to be reduced while increasing the output of the motor 1.

Figure 12:
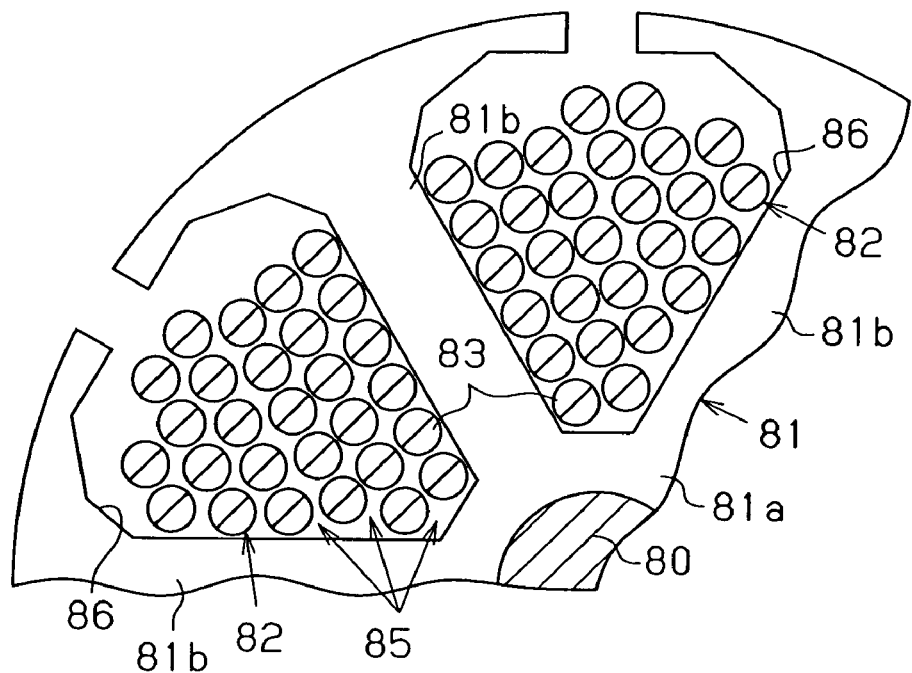
FIG. 12 is a partial cross-sectional view showing a core of an armature in the prior art.
Figure 13:
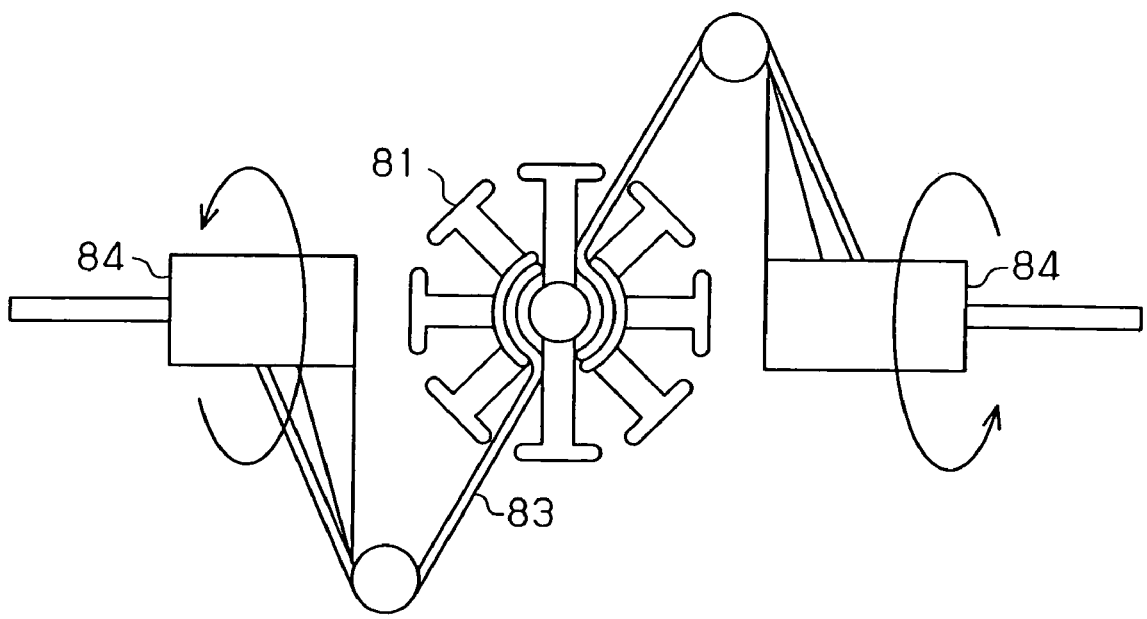
FIG. 13 is a schematic diagram showing the winding of wire to the core in the prior art of FIG. 12.

(2) The wires 16 are arranged next to each other so that the gap between the outer surfaces of the adjacent wires 16 is subtle. Further, the gap between the periphery of the bundle 17 of the wires 16 and the inner wall 14 of the coil slot 13 is subtle. Since each coil slot 13 does not have any gaps 85, or dead space, such as those shown in FIG. 12, heat radiation is increased when current flows therethrough and voltage is applied to the coil 8.

(3) The wires 16, which are cut into a predetermined length, are bundled into a shape matching that of each coil slot 13. The bundle 17 of the wires 16 is then fitted into each coil slot 13 from the end face of the core 7, and the ends of the wires 16 are connected to each other. This forms the coil 8 in the coil slot 13. In this case, in comparison to when winding the wires 83 to the core 81 as in the prior art, the coil 8 is formed without being affected by the quantity of the windings of the coil 8 or the quantity of the coil slots 13. In addition, each bundle 17 of the wires 16 is connected to the pattern boards 10 to form the coil 8. This drastically reduces the manufacturing time and improves working efficiency when forming the coil 8. Accordingly, the manufacturing cost of the motor 1 is reduced.

(4) The wires 16 are hexagonal and have corners formed at obtuse angles. This prevents the insulative coating from being scratched and damaged when the wires 16 come into contact with each other. Thus, deficiencies, such as short-circuiting between adjacent wires 16, do not occur. This increases the reliability of the motor 1.

(5) In the preferred embodiment, the core 7, which is formed by sintering soft magnetic metal powder, is brittle. However, the outer wall 7c of the core 7 extends continuously in the circumferential direction. This increases the mechanical strength of the core 7. Thus, cracks are not produced in the core 7 when the armature 5 is rotated. In addition, the nonmagnetic sections 15 are formed by locally heating the outer wall 7c of the core 7 with a laser beam. This prevents cracks from being produced when the core 7 is being processed.

(6) The core 7 is formed by sintering soft magnetic metal powder. The entire surface of the core 7 is then coated by an insulative oxide film. This eliminates the need for arranging an insulator or applying a resin coating between the coil 8 and the core 7 for insulation. In other words, insulation between the coil 8 and the core 7 is ensured by using the wires 16, which are coated with insulative material such as enamel. This increases the working efficiency and reduces material costs, which in turn, further reduces the manufacturing cost of the motor 1.

(7) The core 7 is formed by compression molding soft magnetic metal powder, which is produced by performing martensitic transformation on austenitic material. Then, the outer wall 7c of the core is locally heated by a laser beam or the like to form the nonmagnetic sections 15, which function as austenitic sections. As a result, the core 7 minimizes magnetic loss and prevents the magnetic flux density from decreasing.

It should be apparent to those skilled in the art that the present invention may be embodied in many other specific forms without departing from the spirit or scope of the invention. Particularly, it should be understood that the present invention may be embodied in the following forms.

Figure 6:
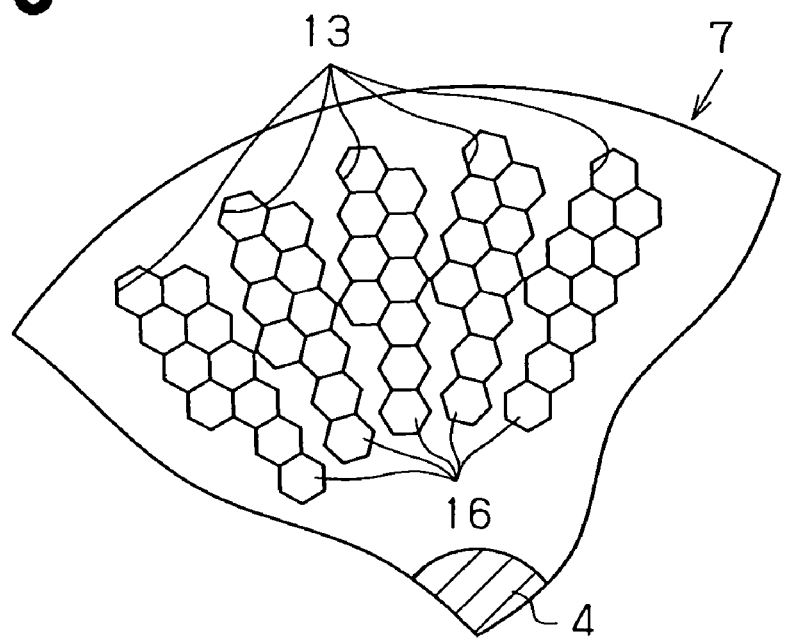
FIG. 6 is a partial cross-sectional view showing a core of a motor according to a further embodiment of the present invention.

In the preferred embodiment, six coil slots 13 are formed at equal angular intervals around the axis of the core 7. However, the quantity of the coil slots 13 is not limited and the core 7 may have any quantity of the coil slots 13. For example, referring to FIG. 6, the quantity of the coil slots 13 may be increased so that the motor 1 produces smooth rotation and is free from vibrations and cocking.

Figure 7:
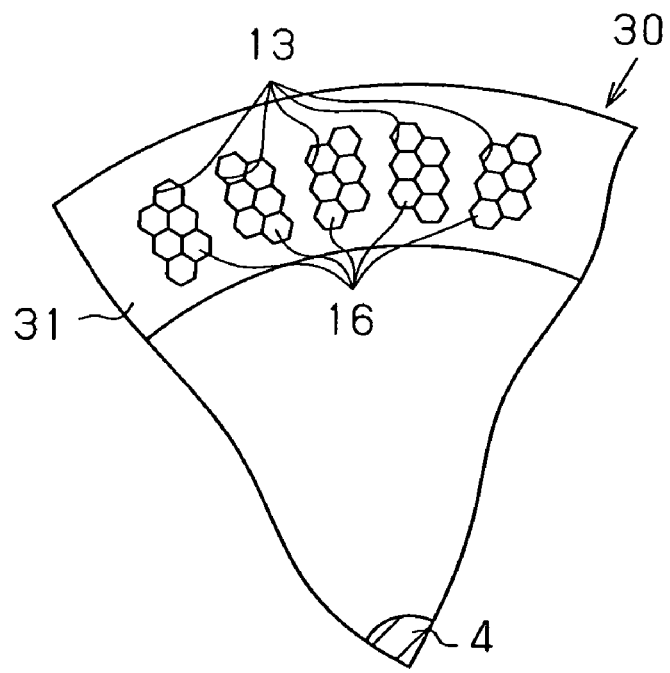
FIG. 7 is a partial cross-sectional view showing a stator of a motor according to a further embodiment of the present invention.

In the preferred embodiment, the present invention is applied to the core 7 of the armature 5 in the motor 1. The present invention may also be applied to a stator 31 of a brushless motor 1, as shown in FIG. 7.

Figure 8:
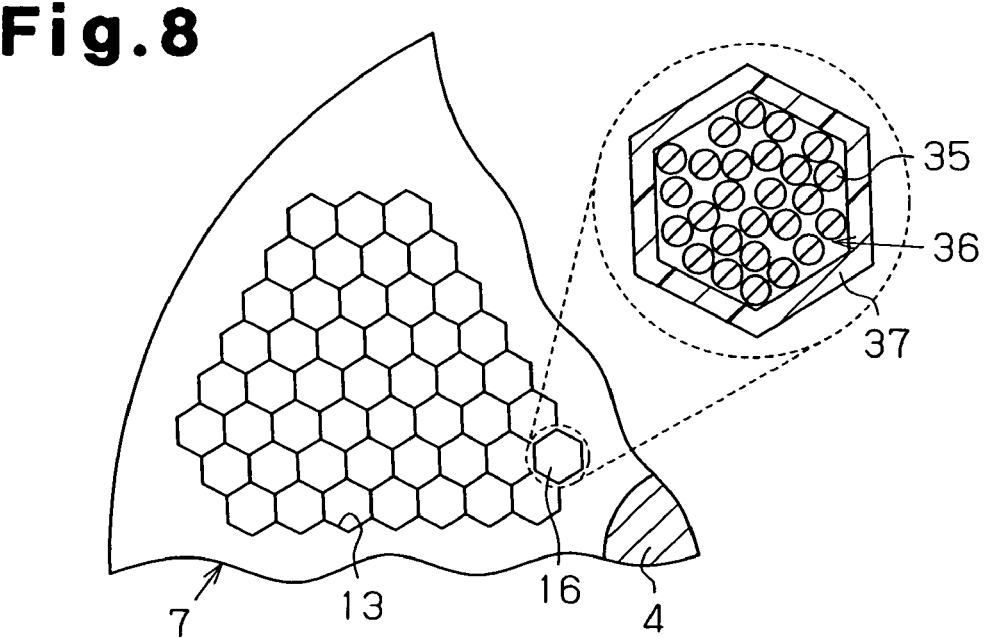
FIG. 8 is a partial cross-sectional view showing a core of a motor according to a further embodiment of the present invention.

Referring to FIG. 8, each wire 16 may be formed by bundling a plurality of conductive fine wires 35 into a wire strand 36, which is coated with an insulative coating such as resin 37.

Figure 9:
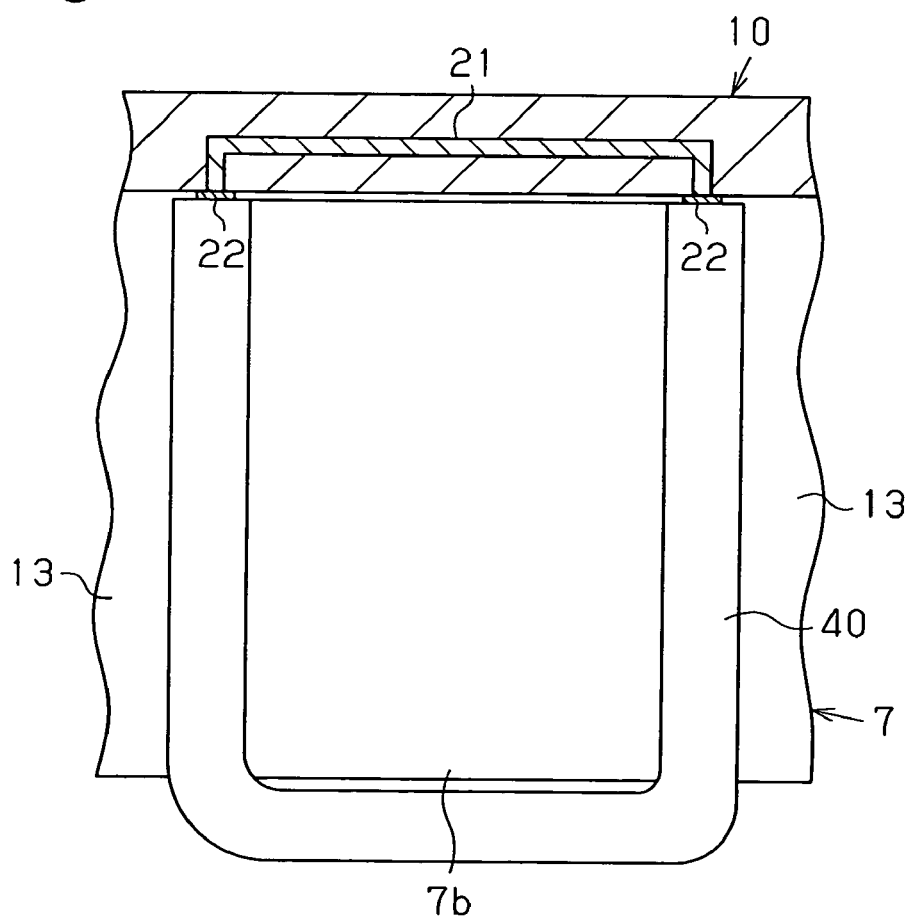
FIG. 9 is a schematic diagram showing the structure of a coil in a further embodiment of the present invention.

In the preferred embodiment, the coil 8 is formed in the coil slots 13 of the core 7 by connecting wires 16 with other wires 16. Referring to FIG. 9, alternatively, a generally U-shaped wire 40 may be inserted in the coil slots 13 and the pattern board 10 may be attached to one of the end faces of the core 7 to connect the two ends of the wire 40.

Figures 10A, 10B, 10C:
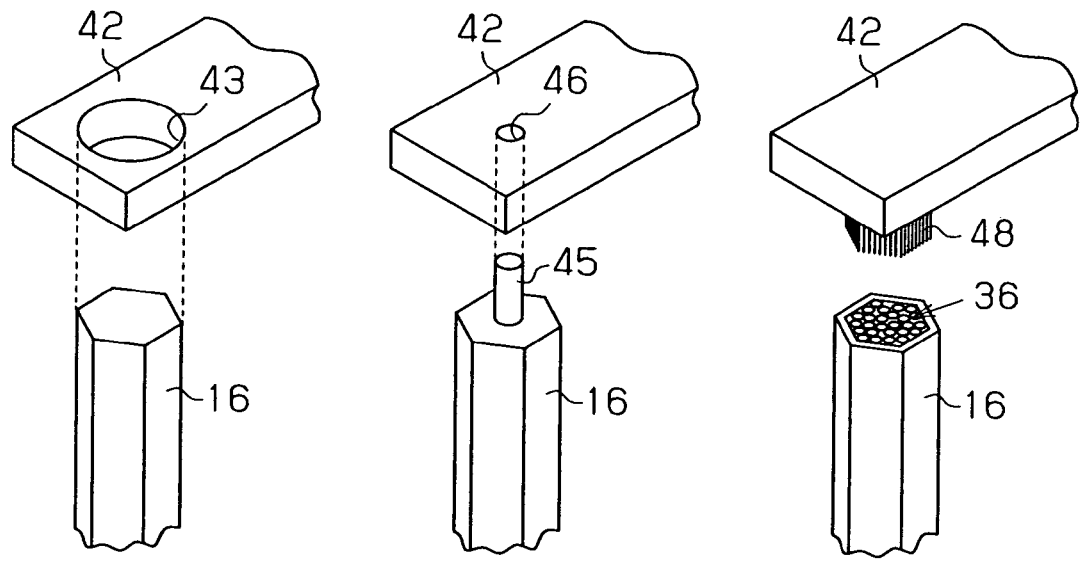
FIGS. 10(a) to 10(c) are partial perspective views each showing the structure of a coil in further embodiments of the present invention.

In the preferred embodiment, the pattern boards 10 are attached to the two end faces of the core 7 to connect the ends of the wires 16. As another alternative, referring to FIG. 10(*a*), a hole 43 may be formed in each of the two ends of a conductive plate 42 to receive the end of a wire and connect the ends of two wires 16. Further, referring to FIG. 10(*b*), a projection 45 projecting from the end of each wire 16 may be fitted into a hole 46 of the conductive plate 42. Referring to FIG. 10(*c*), when each wire 16 is formed by a wire strand 36, pins 48 may be arranged on each end of the conductive plate 42 and fitted into the end of the wire 16.

Figure 11:
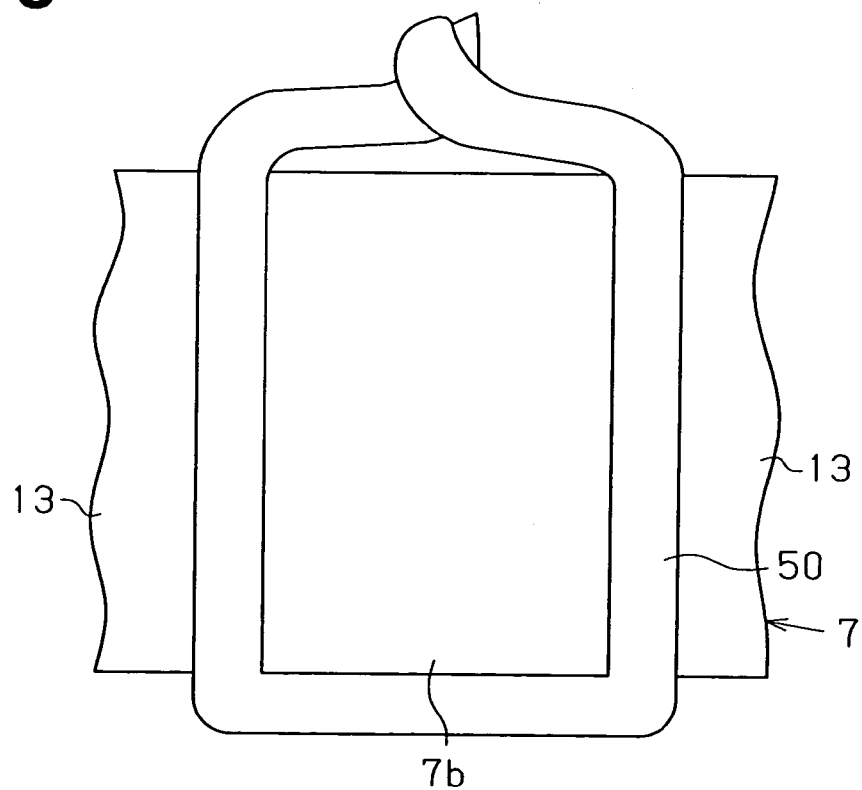
FIG. 11 is a schematic diagram showing the structure of a coil in a further embodiment of the present invention.

Referring to FIG. 11, a generally U-shaped wire 50 may be inserted in the coil slots 13, and the ends of the wire 50 may be tied together to form the coil 8 in the coil slots 13 of the core 7.

In the preferred embodiment, soft magnetic metal powder is sintered to form the core 7. Alternatively, the core 7 may be formed by superimposing electromagnetic steel plates.

In the preferred embodiment, the core 7 is formed by compression molding soft magnetic metal powder, which is formed by performing martensitic transformation on austenitic material. Alternatively, the core 7 may be formed by compression molding nonmagnetic metal powder to produce a molded product. Heat treatment is then performed on the molded product. As a result, the molded product undergoes martensitic transformation and is entirely magnetized to form the core 7. The outer wall 7c of the core 7 is then locally heated by a laser beam or the like to form the nonmagnetic sections 15. This minimizes magnetic loss and prevents the magnetic flux density from decreasing.

In the preferred embodiment, the nonmagnetic sections 15 are formed by heating the outer wall 7c of the core 7 with a laser beam. However, the nonmagnetic sections 15 may be defined by openings formed in the outer wall 7c of the core 7.

In the preferred embodiment, the wires 16 have cross-sections that are regular hexagons. However, the wires 16 may have cross-sections that are regular polygons, such as a regular triangular or regular square cross-section.

The present examples and embodiments are to be considered as illustrative and not restrictive, and the invention is not to be limited to the details given herein, but may be modified within the scope and equivalence of the appended claims.

What is claimed is:

1. An armature for a rotary electric machine, the armature comprising:
   a core formed of compression-molded metal powder and including a continuous outer wall, an inner wall formed integrally with the outer wall and defining a slot, a nonmagnetic section arranged on the outer wall, and an axis;
   an insulative oxide film entirely covering the core; and
   a coil including a coil portion, the coil portion comprising a plurality of wires, the coil portion being fitted to the slot in the axial direction of the core in a state in which the wires are bundled together, wherein the wires have a length that is substantially the same as the axial length of the core.

2. The armature according to claim 1, wherein the nonmagnetic section is formed on part of the outer wall along the axial direction of the core in a state in which the outer wall is pressurized or heat-treated.

3. The armature according to claim 1, wherein the metal powder is austenitic material.

4. The armature according to claim 1, wherein the core includes an austenitic portion, the nonmagnetic section being defined by the austenitic portion.

5. The armature according to claim 1, wherein the coil portion has a shape, and the inner wall that defines the slot is shaped in accordance with the shape of the coil portion to enable the coil portion to be fitted in the slot.

6. The armature according to claim 1, wherein the coil portion has a polygonal cross-section, and the inner wall defining the slot is formed to enable the coil portion to be fitted in the slot.

7. The armature according to claim 6, wherein the coil portion has a regular polygon-shaped cross-section.

8. The armature according to claim 6, wherein the coil portion has a regular hexagon shaped cross-section.

9. The armature according to claim 6, wherein one of the wires is electrically connected to another one of the wires through an electrical contact pressed against the end of the wires.

10. The armature according to claim 9, wherein each of the wires has a regular polygon-shaped cross-section.

11. The armature according to claim 6, wherein the core further includes:
    a tooth for partitioning the slot into a plurality of partitioned slots, the coil having a plurality of coil portions, each being fitted into one of the partitioned slots; and
    a conductive member for electrically connecting the coil portions fitted in the partitioned slots.

12. The armature according to claim 11, wherein the coil portions each comprise a plurality of bundled wires, each of the wires having a regular polygon-shaped cross-section, and one of the wires being electrically connected to another one of the wires through an electrical contact pressed against the end of the wires.

13. An armature for a rotary electric machine, the armature comprising:
   a core including a continuous outer wall, an inner wall formed integrally with the outer wall and defining a slot, a nonmagnetic section arranged on the outer wall, and an axis; and
   a coil including a coil portion the coil portion comprising a plurality of wires having a length that is substantially the same as the axial length of the core, the coil portion being fitted to the slot in the axial direction of the core in a state in which the wires are bundled together, wherein the coil portion has a substantially regular polygon-shaped cross-section, and the inner wall that defines the slot is shaped in accordance with the shape of the coil portion to enable the coil portion to be fitted in the slot.

14. The armature according to claim 13, wherein the coil portion has a substantially regular hexagon shaped cross-section.

15. The armature according to claim 13, wherein one of the wires is electrically connected to another one of the wires through an electrical contact pressed against the end of the wires.

16. The armature according to claim 13, wherein each of the wires has a substantially regular polygon-shaped cross-section.

17. The armature according to claim 13, wherein the core further includes:
   a tooth for partitioning the slot into a plurality of partitioned slots, the coil having a plurality of coil portions, each being fitted into one of the partitioned slots; and
   a conductive member for electrically connecting the coil portions fitted in the partitioned slots.

18. The armature according to claim 17, wherein the coil portions are each formed by the bundled wires, each of the wires having a substantially regular polygon-shaped cross-section, and one of the wires being electrically connected to another one of the wires through an electrical contact pressed against the end of the wires.

* * * * *